United States Patent
Han

(10) Patent No.: US 6,856,901 B2
(45) Date of Patent: Feb. 15, 2005

(54) DISPLAY METHOD AND APPARATUS FOR NAVIGATION SYSTEM

(75) Inventor: Maung W. Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/452,741

(22) Filed: Jun. 2, 2003

(65) Prior Publication Data

US 2004/0243306 A1 Dec. 2, 2004

(51) Int. Cl.[7] .............................................. G01C 21/30
(52) U.S. Cl. ..................... 701/211; 701/208; 701/212; 340/995.17; 340/995.24
(58) Field of Search ................. 701/208, 211, 701/212; 340/995.1, 995.17, 995.24

(56) References Cited

U.S. PATENT DOCUMENTS 6,240,361 B1   5/2001  Ise et al.
6,405,129 B1 *  6/2002  Yokota ..................... 701/208
2002/0130906 A1 * 9/2002  Miyaki ..................... 345/837

FOREIGN PATENT DOCUMENTS

JP       09-244 528       9/1989

* cited by examiner

*Primary Examiner*—Gertrude A. Jeanglaude
(74) *Attorney, Agent, or Firm*—Muramatsu & Associates

(57) ABSTRACT

A display method and apparatus for navigation system enables a user to easily see crowded POI icons and their positions in a small area on the map image by shifting the positions of POI icons in radial directions. The display method includes the steps of specifying POI icons on a map image within a region of a predefined region mark, forming a position rim which is a circle with a center of the region mark, displacing the POI icons within the region mark in radial directions to the position rim, displaying position marks at positions where the POI icons are located before the displacement within the region mark, and displaying lead lines each connecting the POI icon displaced to the position rim and the corresponding position mark.

26 Claims, 14 Drawing Sheets

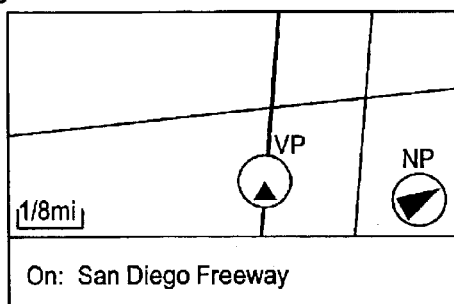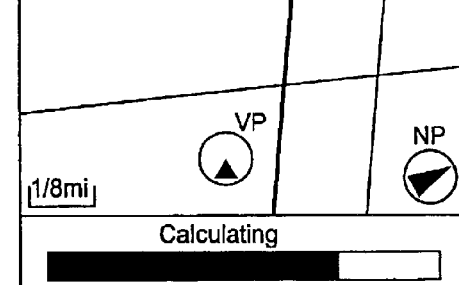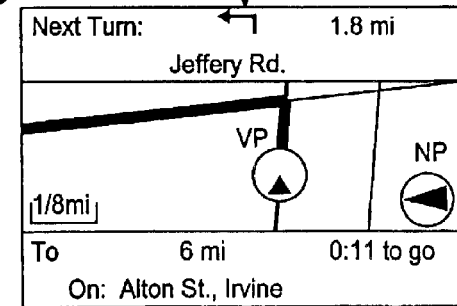

Scroll

Zoom In

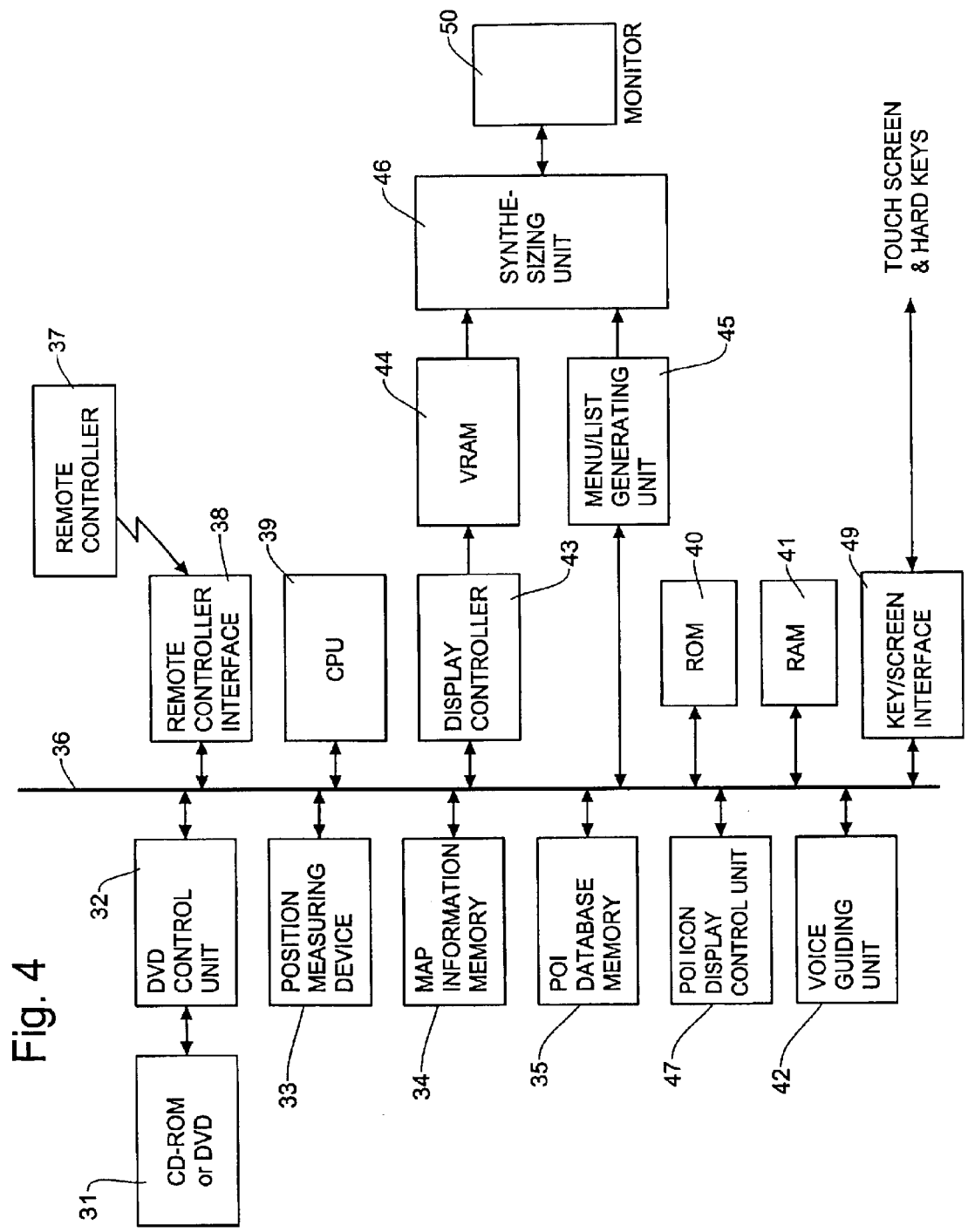

DISPLAY METHOD AND APPARATUS FOR NAVIGATION SYSTEM

FIELD OF THE INVENTION

This invention relates to a display method and apparatus for navigation system for displaying "Point of Interest (POI)" icons on a map image, and more particularly, to a display method and apparatus which is capable of more clearly displaying the POI icons and their positions in a region of attention by displacing the POI icons in radial directions relative to a reference center.

BACKGROUND OF THE INVENTION

A navigation system performs travel guidance for enabling a user to easily and quickly reach the selected destination. A typical example is a vehicle navigation system where a user drives a car having a vehicle navigation system. Such a navigation system detects the position of the user or user's vehicle, reads out map data pertaining to an, area at the current vehicle position from a data storage medium, for example, a CD-ROM (compact disc read-only memory), a DVD (digital versatile disc), or a hard disc. Alternatively, such map data can be provided to the user from a remote server through a communication network such as Internet. The navigation system displays a map image on a monitor screen while superimposing a mark representing the current location of the user on the map image.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, or the route without using toll road, and the like.

During the route guidance, the navigation system reads the nodes data from the data storage medium such as DVD and successively stores the nodes data of road segments (expressed in longitude and latitude) constituting the guided route in a memory. In the actual traveling, the node series stored in the memory is searched for a portion of the guided route to be displayed in a map display area of the monitor, screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

FIGS. 1A–1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen. However, in this, situation, the navigation system does not perform the route guidance function because the destination is not specified.

FIGS. 1B–1F show an example of process for specifying a destination in the navigation system. When selecting a "Destination" menu on a main menu screen (not shown), the navigation system displays an "Find Destination By" screen as shown in FIG. 1B for specifying an input method for selecting the destination. The "Find Destination By" screen lists various methods for selecting the destination. The methods include "Address" for specifying the city and address of the destination, "Intersection" for specifying the names of two streets which intersect with one another, and "Point of Interest" (POI) for selecting the programmed destination based on the name, category or telephone number. Other methods in the "Find Destination By" screen include "Recent Route" for specifying the destination based on the recent history of destinations saved in the navigation system, "Address Book" for selecting the address of the destination out of the prescribed address list stored in the system, and "Today's Plan" for selecting two or more destinations.

When selecting, for example, the "Point of Interest" method in FIG. 1B, the navigation system displays selection methods of point of interest (POI) either by "Place Name" or "Place Type" in FIG. 1C. The "Place Name" is to specify a name of POI, and the "Place Type" is to specify a category of POI. If the "Place Type" is selected in FIG. 1C, the navigation system shows an "Select Category" screen such as shown in FIG. 1D. The screen of FIG. 1D lists categories of POI such as "ATM", "BanK", "Gas Station", "Hospital", "Movie Theater", and "Restaurant".

Suppose the user selects "Restaurant", the navigation system retrieves the POIs in the selected category, restaurant, in this case, as shown in FIG. 1E. Typically, POIs (restaurants) will be listed in the order of distance from the user (ex. current vehicle position). If the user selects a particular restaurant from the list, such as "Genkai", the navigation system displays a "Confirm Route" screen such as shown in FIG. 1F. In this example, the "Confirm Route" screen lists the name, address and phone number of the destination (POI specified by the user). If this is the correct destination, the user enters an "OK to Proceed" key to proceed to the next procedure.

In FIG. 1G, the navigation system calculates and determines a route to the destination, i.e., the selected POI. The navigation system determines a route to the destination based on, for example, the shortest way to reach the destination, the route using many free ways as possible or the route without using toll road, and the like. In this example, the navigation system displays a progress scale of the calculation of the route.

After determining the guided route, the navigation system starts the route guidance as shown in FIG. 1H to guide the user along the calculated route to the destination. Typically, the navigation system shows the intersection which is highlighted to show the next turn and a direction of the turn. Such route guidance by the navigation system is also accompanied by voice instructions.

One of the methods to specify the destination is to directly utilize POI icons on a map image an example of which is shown in FIGS. 2A–2E. Typically, in FIG. 1A, a mark for the vehicle current position (VP) is shown on the map image at the center of the screen. If the map image is in an appropriate map scale, POI icons 21–22 will be also displayed in the map image as shown in FIG. 2A. The user scrolls the map image and moves a region of attention close to the cursor 24 which is, for example, fixed at the center of the screen. Then, in FIG. 2B, a balloon message "POI Icon List" will be displayed which indicates that a list of POI in the area of the cursor 24 will be displayed in the next screen.

Thus, when the map image is zoomed-in as shown in FIG. 2C so that the POI may be easily identified, and the enter key is pressed, the navigation system displays a POI name list 25 as shown in FIG. 2D. If the user selects a preferred POI, for example, "Mobile" as a destination, then, the address of the POI 23 is displayed on the name list. By further pressing the enter key, a "Confirm Route" screen is displayed as shown in FIG. 2E. If the "OK to Proceed" key is pressed, the navigation system calculates the route and performs the route guidance to the destination.

As described above, the user can also specify the route to the destination by directly using the map image on the screen. However, the user may have difficulty in specifying the destination when searching the POI icons on the map image because sometimes too many POIs are located in a small area such as in a downtown, a shopping mall or other large compounds. Thus, when the user scrolls the map image of the downtown to display an region of attention, many POI icons 27 will be displayed such as shown in FIG. 3B.

In such a situation, although the user scrolls and moves the crowded POI icons around the center in the map images, he cannot easily identify the icons because some POI icons. 27 are overlapped. The problem becomes worse if there are many overlapping POI icons (for example, restaurants) crowded in such an area. Because each POI icon needs to have a sufficient size for a user can see it on the navigation screen, POI icons will be overlapped when many POI icons have to be displayed within in a small area. Further, because a monitor screen of a navigation system has a limited resolution, it is difficult to display POI icons with a small size while maintaining clear view for the user.

As described in the foregoing, it is not always possible to display POI icons and their positions on the map image due to the limitation of the screen resolution and POI icon sizes. As a result, it is not possible to decide as to which side of the street a particular POI is located. As noted above, frequently, POI icons are overlapped and the user cannot distinguish one POI icon from the other. Thus, it is not easy for the user to specify the destination by the method of directly using POI icons on the map image. Thus, there is a need for a new display method for easily and quickly distinguishing the POI icons.

SUMMARY OF THE INVENTION

It is, therefore, an object of the present invention to provide a navigation system which enables a user to more easily identify "Point of Interest (POI)" icons within a specified small area, such as a cursor circle when the POI icons are crowded within such an area.

The display method and apparatus of the present invention is capable of more clearly displaying POI icons by: shifting the POI icons in radial directions in such a way that the user can easily see the relationship between the original positions and the shifted POI icons.

More specifically, the display method of the present invention includes the steps of specifying POI icons on a map image within a region of a predefined region mark, forming a position rim with respect to a center of the region mark, displacing the POI icons within the region mark in radial directions to the position rim, displaying position marks at positions where the POI icons are located before the displacement within the region mark, and displaying lead lines each connecting the POI icon displaced to the position rim and the corresponding position mark.

The display method of the present invention further includes a step of changing a position or a size of the predefined region mark on the map image so that original positions of the POI icons before the displacement are outside of the region mark, and a step of reverting back the displaced POI icons whose current positions are outside of the region mark to the original positions.

Preferably, the display method further includes a step of forming a plurality of position rims which are concentric with respect to the center of the region mark, and a step of displacing POI icons at shorter distances from the center to an inner position rim while displacing POI icons at longer distances from the center to an outer position rim. When displacing the POI icons to the plurality of position rims, the display method of the present invention shifts the POI icons in the same or substantially the same radial direction to the position rims in an order of distance from the center of the predefined region mark.

Typically, the predefined region mark is a cursor circle on a monitor screen of a navigation system or a predetermined mark whose covering area can be varied or predefined by the navigation system. Preferably, predetermined attributes are assigned to the lead lines, position marks, and the displaced POI icons to distinguish two or more POI icons displaced in an identical or similar radial direction. Such predetermined attributes include colors, line types and shapes, and a consistent rule for assigning the attributes is used throughout an operation of displacing the POI icons based on positions of the POI icons.

In another aspect of the display method of the present invention, rather than displacing the POI icons to the position rims, the navigation system shifts the POI icons in the radial direction in proportion to the distance of the original POI icons from the center. Thus, the displaced POI icons establish an accurate and enlarged view of the positional relationship among the original POI icons. The position rims function as position scales to assist the user to know the positional differences in the POI icons. The displaced POI icons are connected to the original position marks through the lead lines, thereby distinguishing the displaced POI icons from other POI icons.

A further aspect of the present invention is a display apparatus for a navigation system. The display apparatus is constituted by various means for achieving the POI search method described above which shifts the POI icons in the radial directions. The POI icons are shifted to be located on the position rim and connected to the original position marks by the lead lines. Alternatively, the POI icons are shifted in proportion to the distances from the center, thereby establishing an enlarged view of the positional relationship of the POI icons.

According to the present invention, the navigation system enables the user to easily identify the POIs in a cursor circle, even if the POIs are crowded in a small area, by automatically moving them to position rims and showing position marks of the POIs to indicate the accurate positions in the cursor circle. Thus the user can easily check the POI icons and select one of the POIs as his destination.

BRIEF DESCRIPTION OF THE DRAWINGS

FIGS. 1A–1H are schematic diagrams showing an example of operational process and screen display of a navigation system for implementing the POI displacement method and apparatus of the present invention.

FIG. 4 is a block diagram showing an example of the structure in a vehicle navigation system for implementing the present invention.

DETAILED DESCRIPTION OF THE INVENTION

Figure 2A:
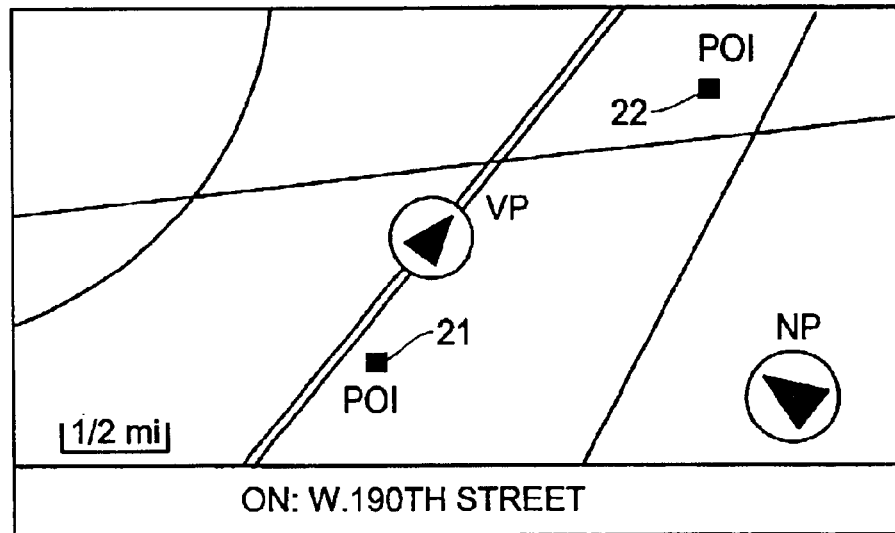
FIGS. 2A–2E are schematic diagrams showing an example of operational process and screen display of a navigation system for specifying a destination by using POI icons on the map image in the conventional technology.
Figure 2B:
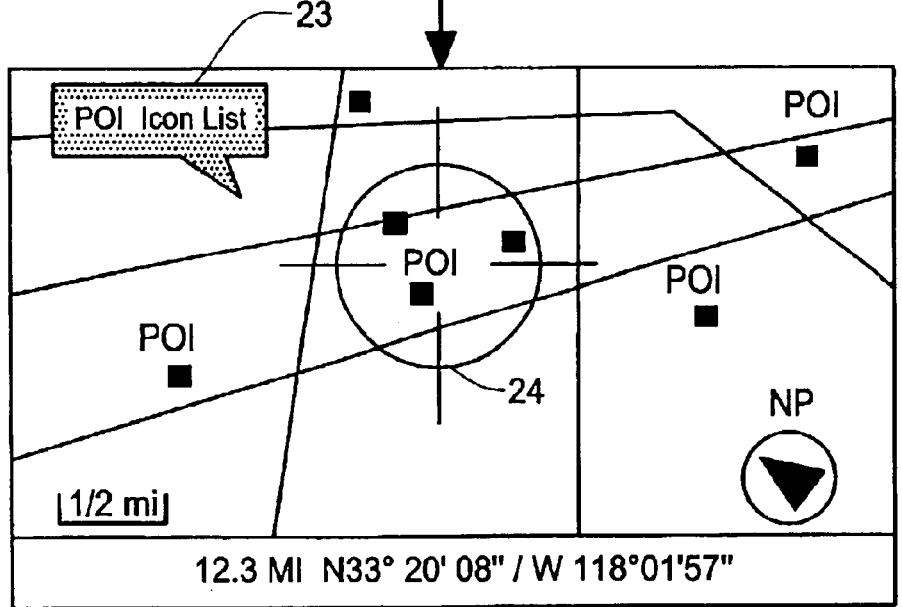
Figure 2C:
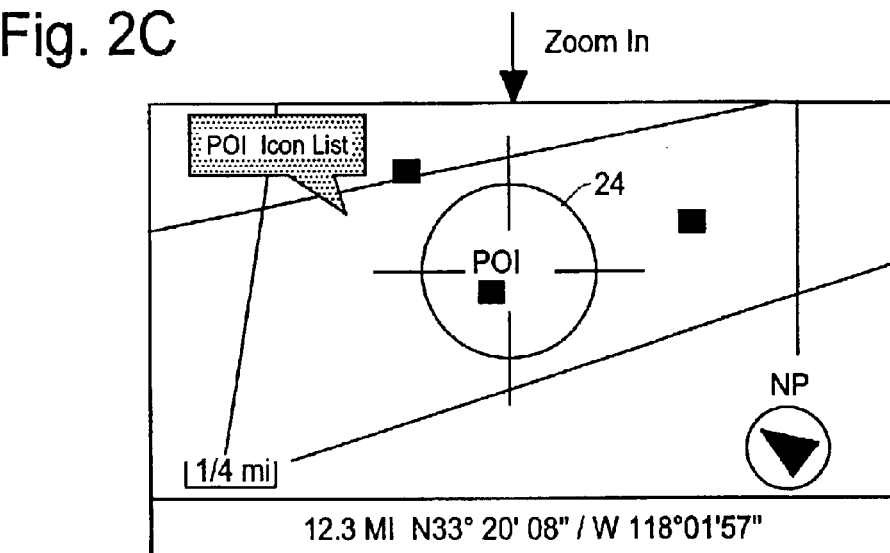
Figure 2D:
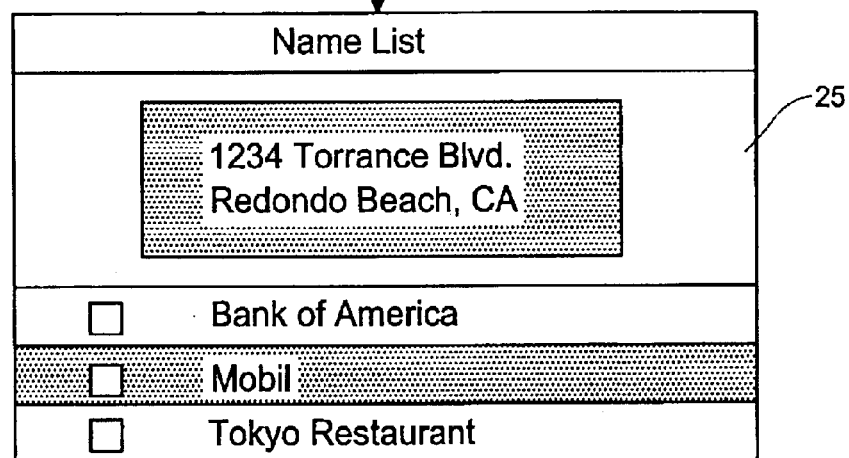
Figure 2E:
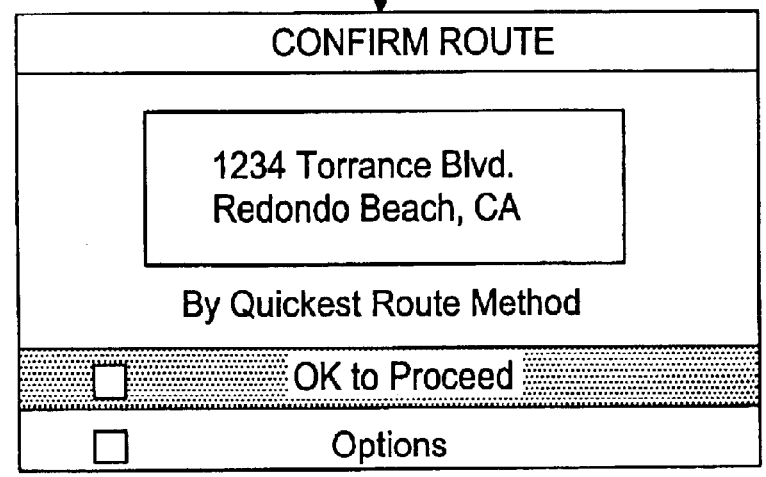
Figure 3A:
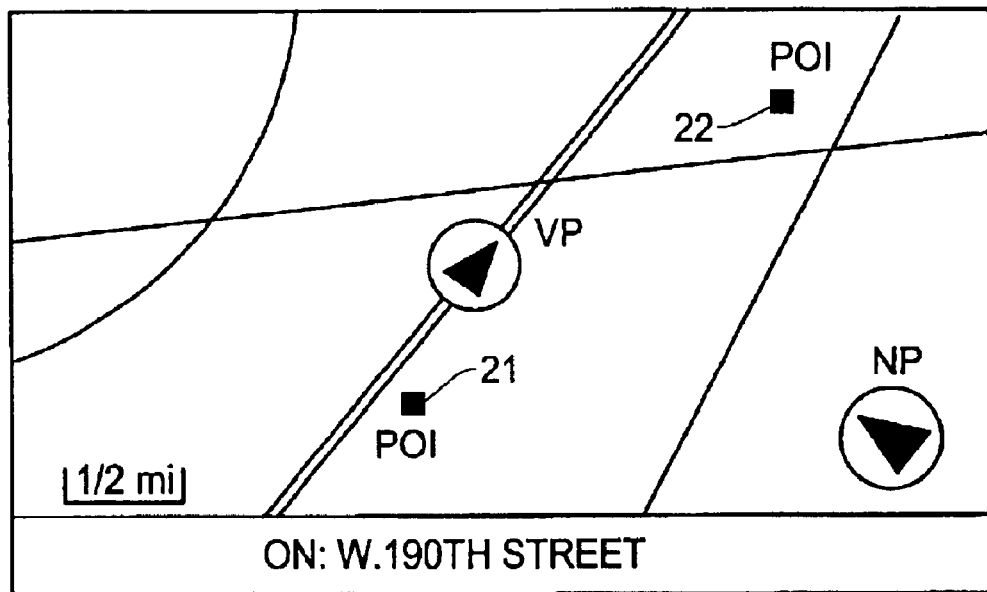
FIGS. 3A–3B are schematic diagrams showing a display example corresponding to the method of FIGS. 2A–2E when many POI icons exist within a small area.
Figure 3B:
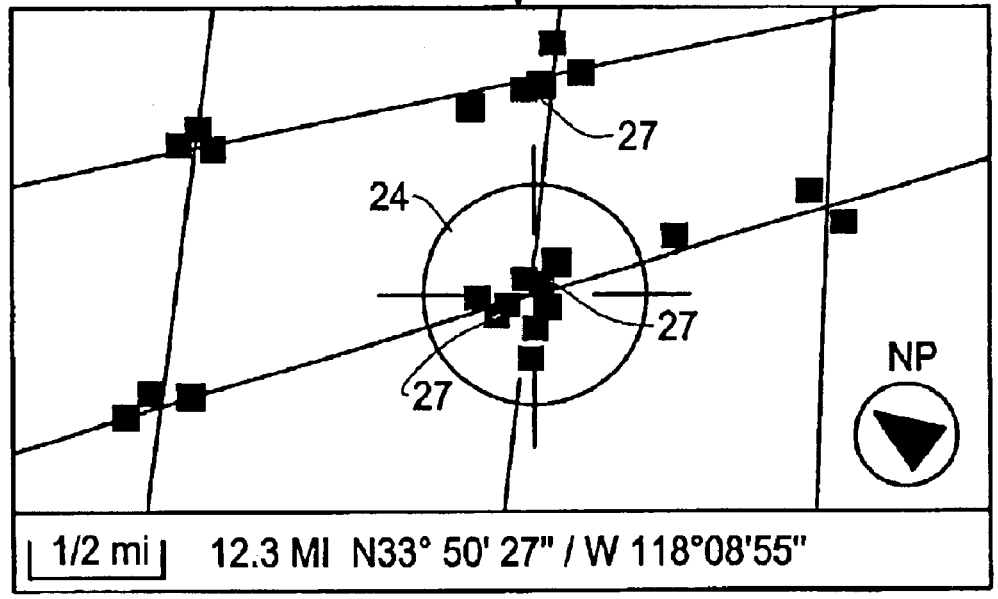

The present invention is described in detail with reference to the accompanying drawings. The navigation system of the present invention is designed to enable a user to easily see an accurate position of points of interest (POIs) by their icons (POI icons) on a map image. In particular, the display method of the present invention is useful when many POI icons are located in a small area. The navigation system displaces the POI icons within a region of attention in radial directions to a position rim or to positions in proportion to the original POI positions relative to a center. Typically, such a region of attention is defined by a cursor of a navigation screen, however any predefined region mark can be used. Preferably, a size of such a region mark can be adjustable by a user.

Such a displacement operation is initiated either automatically or by an instruction from the user. Thus, by changing a position or a size of the region mark on the map image, the navigation system starts displacing the POI icons within the region mark. If the original positions of the POI icons before the displacement now become outside of the region mark, the navigation system reverts back the displaced POI icons to the original positions. The navigation system displays position marks showing the original positions of the POI icons and connects the position marks to the displaced POI icons through lead lines. Accordingly, the user can easily identify locations of the POIs by combinations of the displaced POI icons, lead lines, position rim, and the original position marks.

FIG. 4 is a block diagram showing an example of structure of a vehicle navigation system implementing the present invention. While the vehicle navigation system is explained for an illustration purpose, the present invention can also be applied to other types of navigation system. For example, the present invention can be advantageously used in a portable navigation device such as a one implemented in a PDA (personal digital assistant) device, a lap-top computer, or other hand-held devices.

The navigation system includes a map storage medium 31 such as a CD-ROM, DVD, hard disc or other storage means (Hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 4 further includes a map information memory 34 for storing the map information which is read out form the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

Figure 5A:
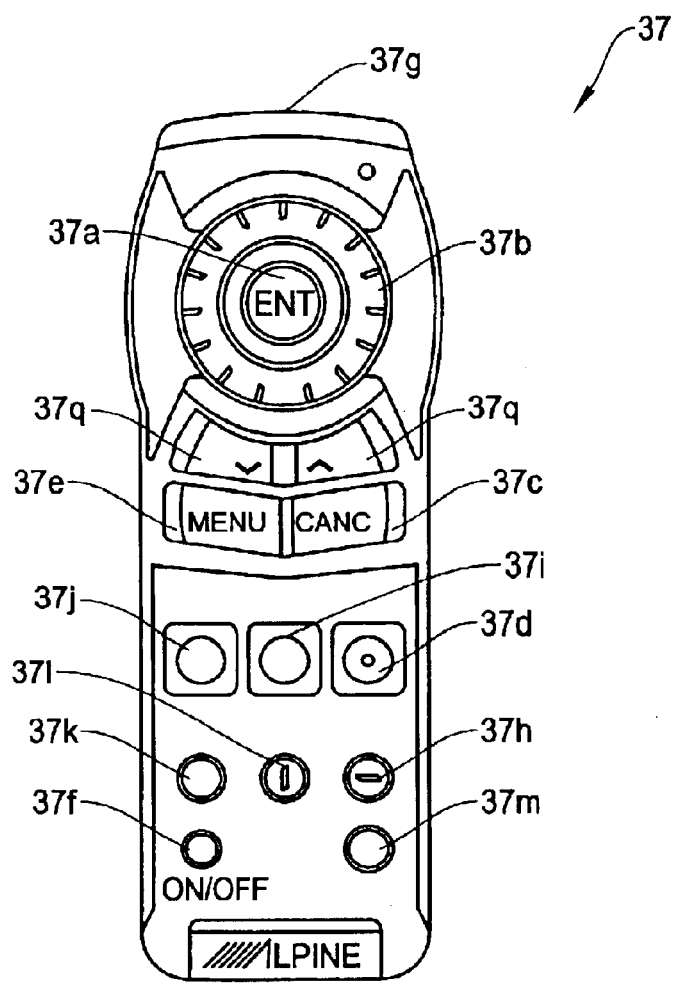
FIGS. 5A and 5B are diagrams showing an example of key arrangement of a remote controller accompanied by the vehicle navigation system of FIG. 4.
Figure 5B:
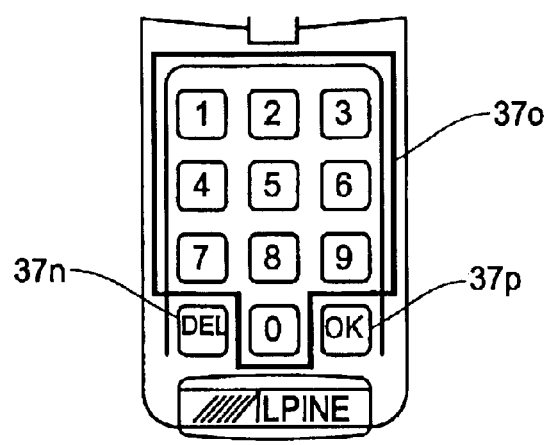

The remote controller 37 has a variety of function keys as shown in FIG. 5A and numeric keys as shown in FIG. 5B. The numeric keys appear when a lid in the lower part of FIG. 5A is opened. The remote controller 57 includes a joystick/enter key 37a, a rotary encoder 37b, a cancel key 37c, an MP/RG key 37d, a menu key 37e, a zoom/scroll key 37q, a monitor ON/OFF key 37f, a remote control transmitter 37g, a plan key 37h, an N/H key 37i, a voice key 37j, a list key 37k, a detour key 37l, a delete destination key 37m, a delete key 37n, numeric keys 37o, and an OK key 37p.

The joystick/enter key 37a selects highlighted items within the menu and moves map displays and a vehicle position icon. The rotary encoder 37b changes zoom scale, scrolls list pages, moves the cursor, and etc. The cancel key 37c cancels the present displayed screen or is operated when returning the screen to the previous menu screen. The MP/RG key 37d toggles between detailed map display and basic guide display during guidance. The menu key 37e displays the main menu. The plan key 37h starts the route set by "Today's Plan" function, the N/H key 37i changes between North-up and Heading-up orientation, the voice key 37j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

Referring back to FIG. 4, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a voice interface and guiding unit 42 for voice communication interface and spoken instructions, a display controller 43 for generating map image (a map guide image and an arrow guide image) on the basis of the map information, a VRAM (Video RAM) 44 for storing images generated by the display controller, a menu/list generating unit 45 for generating menu image/various list images, a synthesizing unit 46, a monitor (display) 50 and a key and screen interface 49 for interfacing with various other input means such as hard keys and joystick on a display panel of the navigation system, and the like.

A POI icon display control unit 47 performs the essential function of the present invention for shifting POI icons to radial directions relative to a predetermined center position based on POI data and map information from the memories 34–35. The POI icons shifted their positions in radial directions are set on corresponding position rims. In another aspect, the POI icons are shifted in the radial directions in proportion to the original position relative to the center. By shifting the positions of the POI icons in this manner, the control unit 47 displays the POI icons with an enlarge positional relationship among the POI icons without overlapping while accurate original positions are indicated by position marks. Thus, the user can easily distinguish and select the desired POI icon.

With reference to FIGS. 6–11, the present invention is described in detail. FIGS. 6A–6D show typical display examples of the present invention. FIG. 6A shows an example of a map image containing several POI icons 70 which are located within a small area. Because POI icons have a predetermined size which must be large enough for a user to see on the monitor screen, POI icons 70 may be overlapped with one another when many POIs exist within a small area. As noted above, this situation occurs frequently when searching for POIs in a crowded area such as a downtown area or a large shopping mall, etc. In this example, it is assumed that the user wants to search POIs in an area at the intersection shown in the left side of FIG. 6A where many POI icons 70 fall within the small area.

First, the user scrolls the map image and points the intersection by a cursor circle 71. It should be noted that although the cursor circle 71 is a typical example for defining a region of attention, other means such as a predefined region marker can also be used. Further, such a predetermined region marker can be changed its size such as a radius of a circle to change the covering range.

Figure 6A:
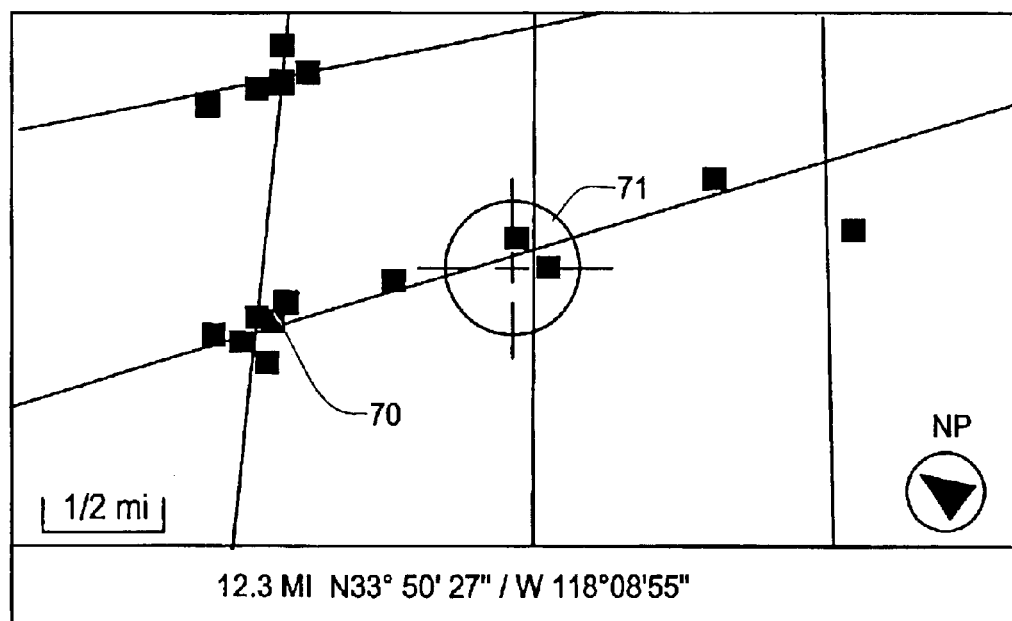
FIGS. 6A–6D are schematic diagrams showing display examples by a method of displacing POI icons in a cursor circle relative to a first position rim in accordance with the present invention.
Figure 6B:
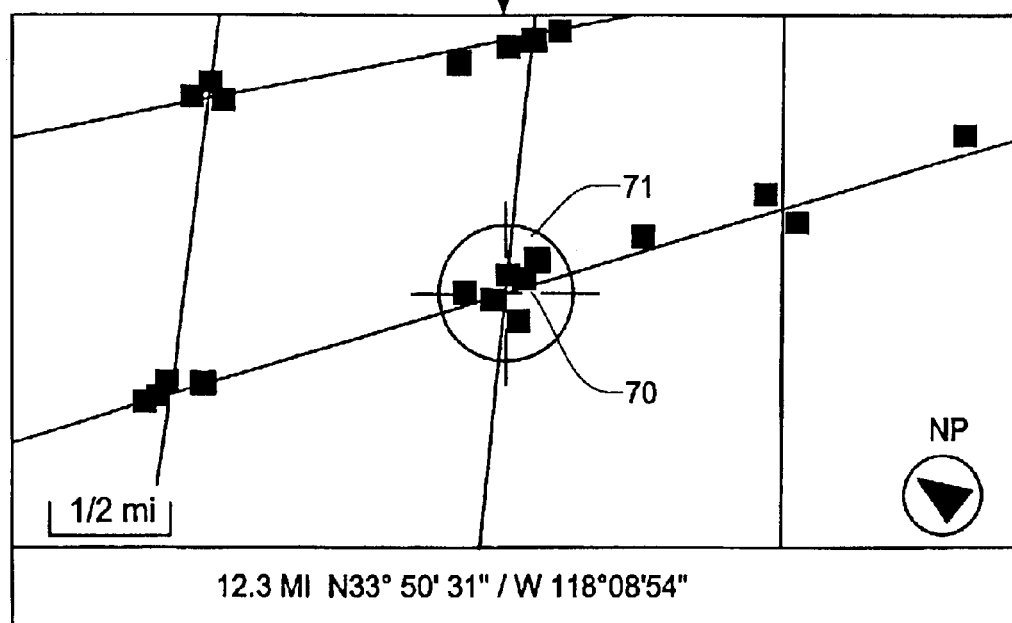
Figure 6C:
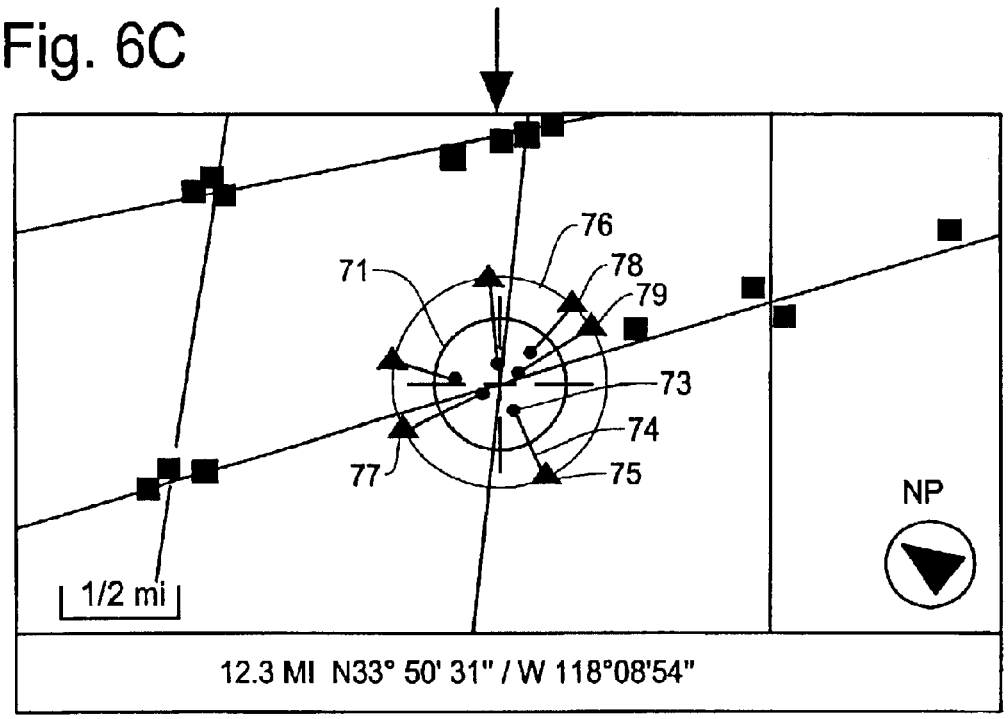

FIG. 6B shows a situation where the cursor circle 71 points the intersection containing many POI icons 70 by scrolling the map image. In the present invention, as soon as the navigation system detects the several POI icons exist within the cursor circle 71 (region of attention), it starts the POI shift (displacement) function. Namely, the navigation system starts displacing the POI icons away from the center of the cursor (or other predefined region mark) 71 as shown in FIG. 6C. The POI icons shifted in this manner are provided with lead lines (root lines) 74, and are placed on a position rim 76 illustrated at an outer area of the cursor 71.

Each position mark 73, which indicates an accurate position where the POI icon has been originally located, is displayed by a predetermined shape or color, for example, a red dot. The size of the position marks 73 is much smaller than the original POI icons so that the original positions of the POI icons are clearly visible since no overlapping occurs in this situation. The displaced (up-rooted) POI icons 75–79 are on the position rim 76 and connected to the original position marks 73 through the lead lines 74. Since the displaced POI icons 75–79 are on the position rim, the user can easily tell that these POI icons 75–79 are the ones whose positions are shifted from the original positions and can distinguish from other POI icons. As a result, the POI icons overlapped within the cursor circle 71 are now separated from one another and placed on the position rim 76. By following the lead line 74 of each POI icon displaced in this manner to the position mark 73, the user can check the actual position of the POI.

Figure 6D:
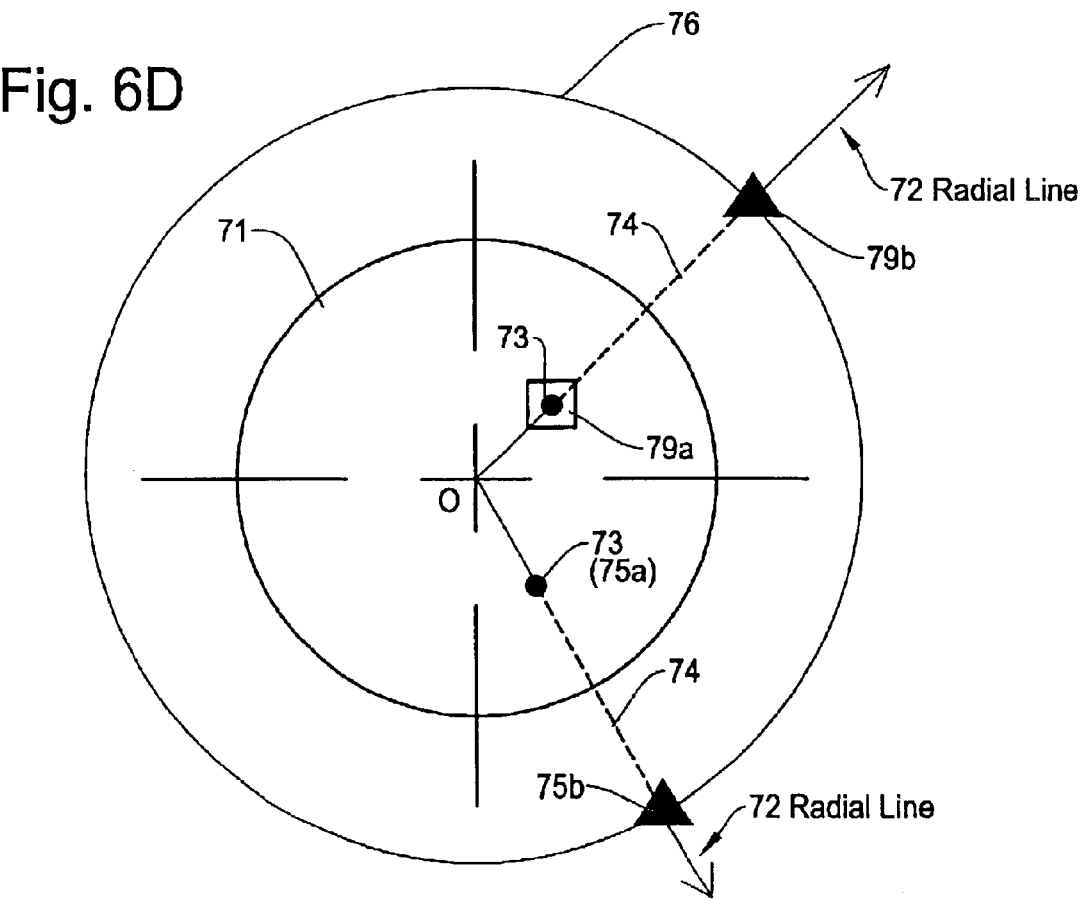

FIG. 6D geometrically shows how the POI icons in the cursor circle 71 are moved. In this example, the POI icons. 75 and 79 in FIG. 6C are illustrated in detail. As shown in FIG. 6D, basically, POI icons 75 and 79 are expanded in the radial directions relative to a center of a circle, such as the cursor circle 71. A POI mark 75a indicates the original POI icon 75 before it is moved and a POI icon 75b indicates the POI icon 75 after the displacement. Similarly, a POI mark 79a indicates the original POI icon 79 before it is moved and a POI icon 79b indicates the POI icon 79 after displacement. Both of the POI icons 75 and 79 are placed on the same position rim 76.

A point "O" indicates a center of the cursor circle 71 or other predetermined region mark. The point O is also a center of the position rim 76 to which the POI icons 75b and 79b are shifted. Radial lines 72 are shown in FIG. 6D which start from the point (center) O" and passes through the original position mark 73 and the position rim 76, although in an actual application, the radial lines 72 are not displayed. The navigation system shifts the positions of the POI icons 75 and 79 along the radial lines 72, from 75a and 79a to the position of the POI icon 75b and 79b, respectively.

The POI icons and lead lines involved in this display method will be assigned with different attributes such as different colors, line types, or shapes from the original POI icons in order to distinguish the up-rooted POI icons from one another or from the normal POI icons outside of the cursor circle 71. For example, as noted above, the position marks 73 have a predetermined attribute such as red dots to indicate the original positions of the POI icons 75 and 79 in the cursor circle 71. Such attributes of the lead lines and POI icons will be described in more detail later.

In FIG. 6D, the lead line 74 connecting the original position 73 and the displaced POI icon 79b is displayed on the screen so that the user can tell the relationship between the two positions. The lead line 74 connecting the original position mark 73 and the displaced POI icon 75b is also displayed on the screen so that the user can tell the relationship between the two positions. The lead lines 74 may be assigned with different attributes such as color, line type, etc. to easily distinguish the POI icons as will be explained later with reference to FIG. 11.

Figure 7A:
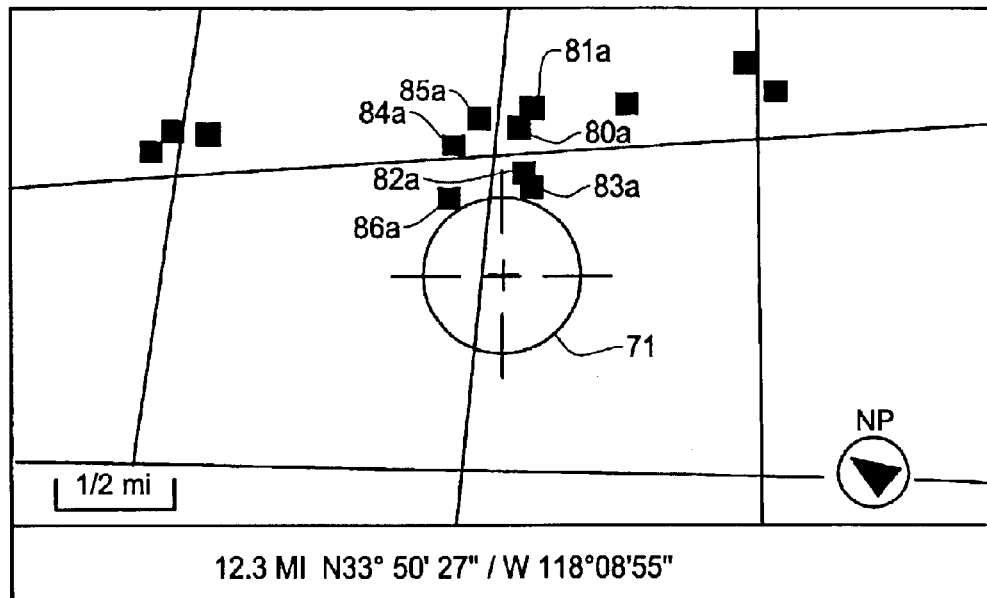
FIGS. 7A–7B are schematic diagrams showing display examples in displacing POI icons toward radial directions relative to a center of cursor circle and placing them either on a first position rim or a second position rim in accordance with the present invention.
Figure 7B:
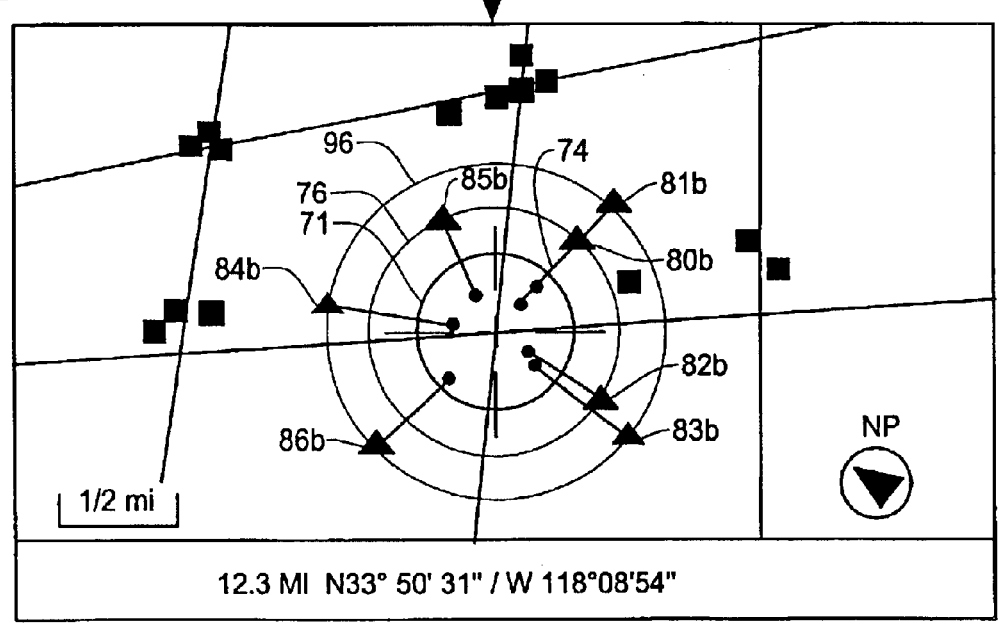

FIGS. 7A–7B show display examples in the display method of the present invention where two position rims are incorporated. First, it is assumed that many POIs icons 80a–86a exist at various locations within a small area as show in FIG. 7A. When the region of attention is specified by the cursor circle 71 by scrolling down the map image, the display method of the present invention starts and expands the locations of the POIs to the POI icons 80b–86b as shown in FIG. 7B. In this example, the navigation system displays two position rims 76 and 96 for sufficiently separating POI icons.

For example, in the case where two POI icons are in the same or similar radial directions, and the two POI icons are placed on the same position rim, it may be difficult for a user to distinguish one POI icon from another. In such a case, two position rims will be advantageously used for distinguishing the two POI icons. This situation is shown in FIG. 8 where a first position rim 76 and a second position rim 96 are incorporated to distinguish POI icons Q1 and Q2 from one another.

The second position rim 96 is formed around the first position rim 76 with respect to the same center O and with a predetermined radius. Marks P1 and P2 indicate original positions of two POIs which are located very close to one another. Accordingly, if both POI icons are displayed on the first position rim 76, then the POI icon Q1 shifted from the position P1 and the POI icon Q2' shifted from the position P2 will be overlapped as illustrated, which makes the user difficult to distinguish the POI icons.

Figure 8:
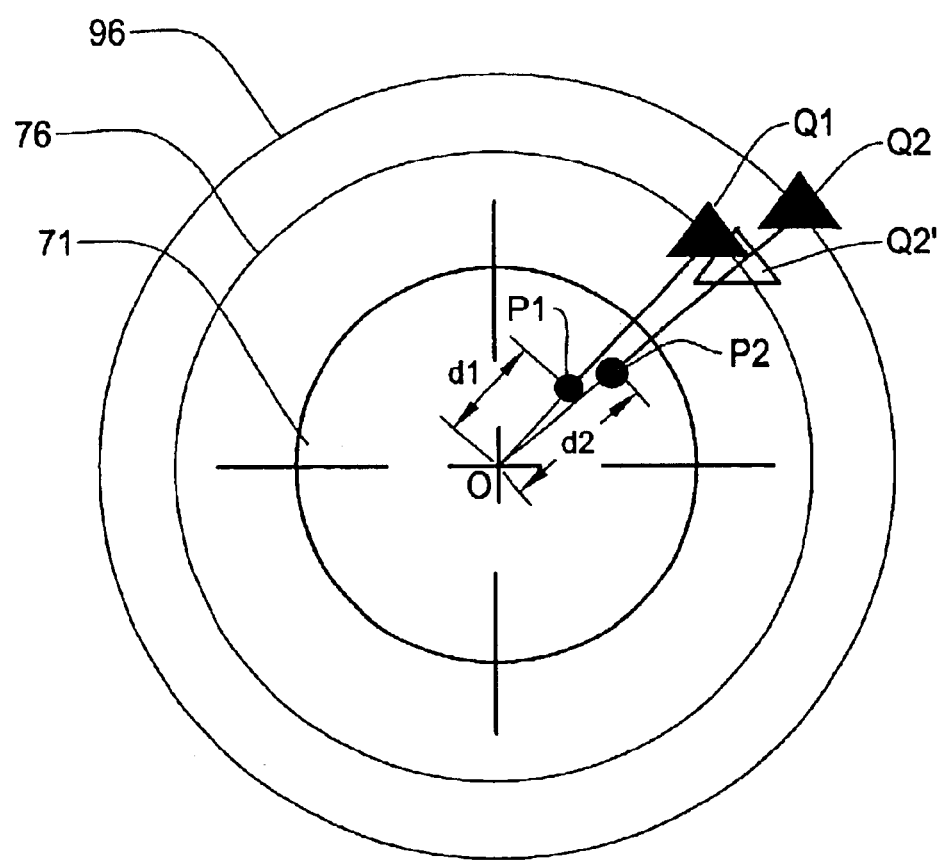
FIG. 8 is a schematic diagram explaining an operation of using the first and second position rims in the example of FIG. 7B in accordance with the present invention.

In the example of FIG. 8, a distance d1 of the position P1 from the center O is shorter than a distance d2 of the position P2 from the center O. Therefore, the navigation system moves the POI icon Q1 to the first position rim 76 and another POI icon Q2 to the second position rim 96. In other words, a POI icon which has a shorter distance from the center is placed on the inner position rim and a POI icons which has a longer distance from the center is placed on the outer position rim. As a result, the POI icons Q1 and Q2 displaced on the different position rims 76 and 96, respectively, are easily distinguishable on the screen.

Figure 9A:
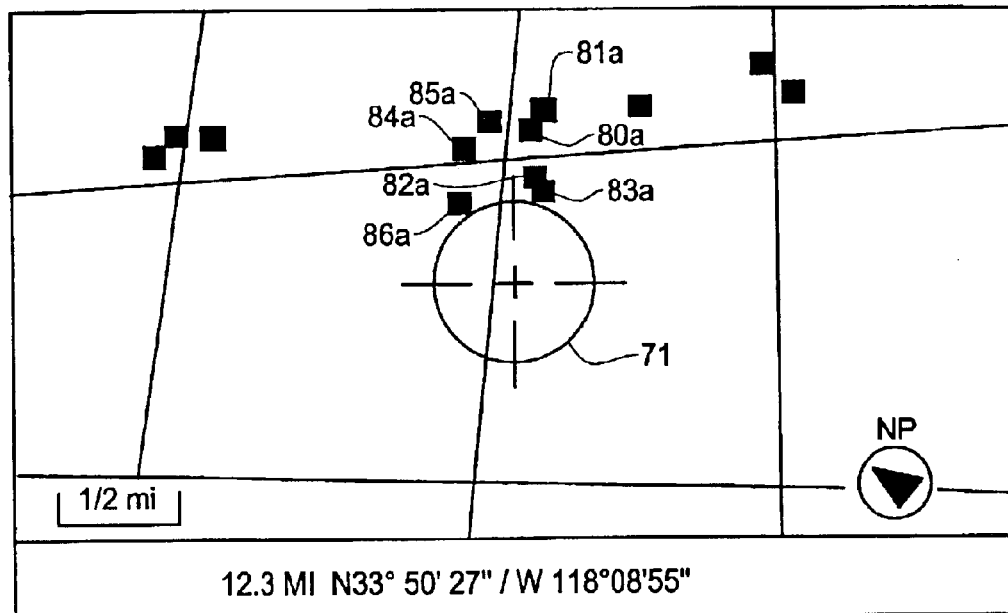
FIGS. 9A–9B are schematic diagrams showing modified version of the present invention with respect to the same POIs of FIGS. 7A–7B where POI icons are displaced in the radial directions in proportion to the actual distances of POIs.
Figure 9B:
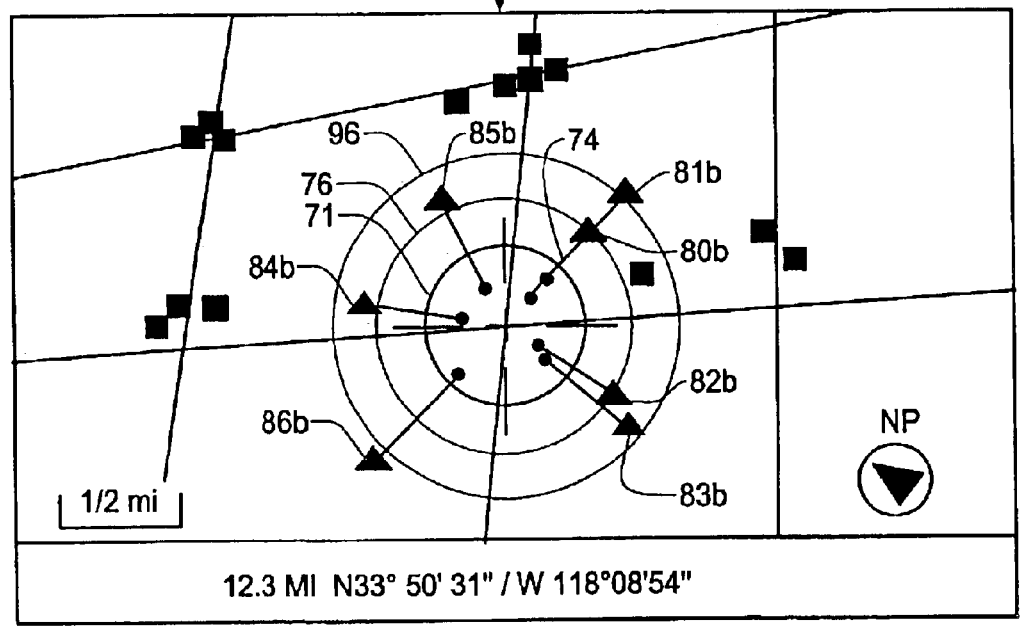

FIGS. 9A–9B show another aspect of the present invention. It should be noted that, in the example of FIGS. 7B and 8, the distance between the two displaced icons Q1 and Q2 is not directly proportional to the difference between the distances d1 and d2. In other words, the POI icons on the position rims do not represent the accurate positions of the POIs. Thus, when the user wants to know the accurate position of the PO or positional relationship among the POIs, he has to check the original position marks of the POIs in the cursor circle. This may not be an easy job for a particular user, such as an elderly person, since the original position marks are small dots as noted above.

In the example of FIGS. 9A–9B, however, displaced POT icons are positioned in proportion to the original positions. Thus, the displaced POT icons show accurate positional relationship among POIs in a manner similar to the situation where the area in the cursor circle is zoomed-in. The difference from the zoom-in function is that the original position marks and the lead lines are still used to differentiate the displaced POI icons from the normal POT icons. Another difference is that the position rims are also, used to clarify the differences in distance and position among the POT icons, i.e., as scale marks.

FIG. 9A shows the map image which is identical to that of FIG. 7 where POT icons 80a–86a are crowed in a small area. By scrolling the map image, the user points the cursor circle 71 so that the POI icons 80a–86a are positioned within the cursor circle 71. Then, the navigation system moves the POT icons in the radial directions as show in FIG. 9B. The distance of the displaced POI from the center O of the cursor 71 is proportional to the distance of the original position of the POI icon from the center O of the cursor 71. In other words, the positions of the POT icons 80b–86b displaced in this operation are accurate representation of the original positions of the POT icons relative to the center of the cursor circle 71.

Figure 10:
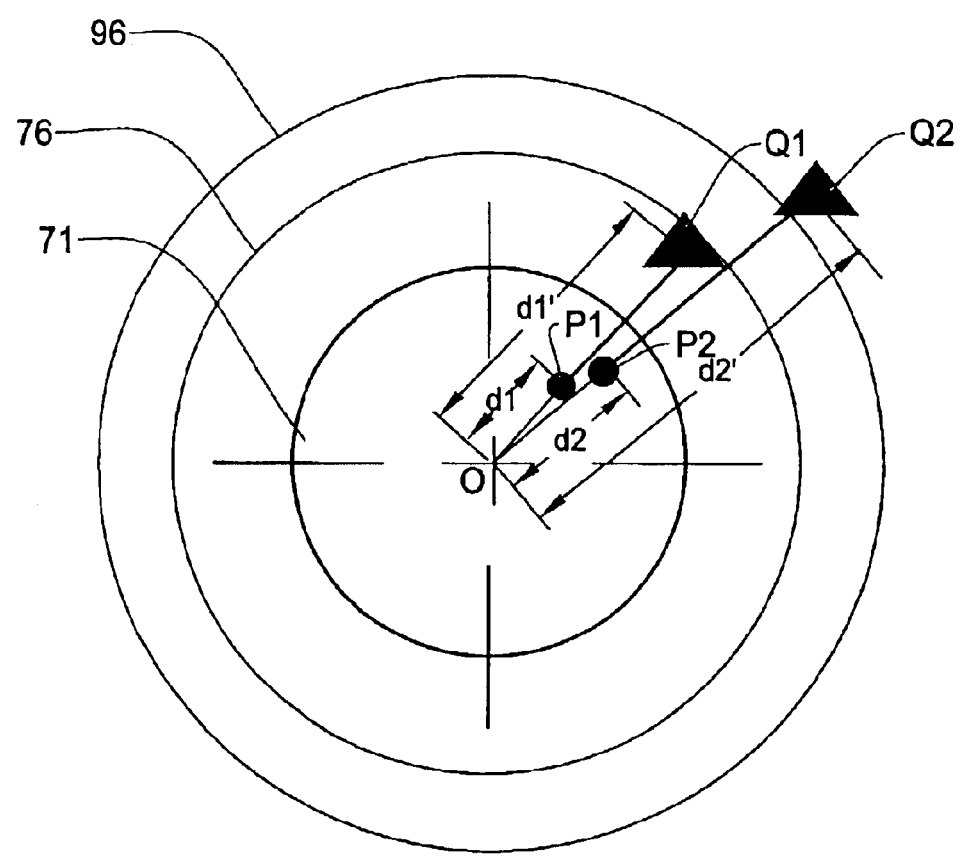
FIG. 10 is a schematic diagram explaining amounts of displacement of POI icons in the modified version of FIG. 9B in accordance with the present invention.

This relationship is more clearly shown in FIG. 10 which is based on the same original POI icons as that of FIG. 8. The distance d1 between the center O and the original position P1 of the POI icon Q1 is expanded to the distance d1'. Similarly, the distance d2 between the center O and the original position P2 of the POI icon Q2 is expanded to the distance d2'. The ratio d1/d1' and the ratio d2/d2' are identical, thus, the positions of the displaced POI icons Q1 and Q2 indicate an accurate and enlarged positional relationship of P1 and P2. The position rims 76 and 96 assist the user to know the positional relationship among POI icons when there are many displaced POI icons.

Accordingly, in FIG. 9B, the POI icons 80b–86b are not necessarily be placed on the position rims 76 and 96, but rather randomly located relative to the position rims 76 and 96. Since the position rims 76 and 96 are coaxial circles relative to the center O, the user can easily observe the positional differences among the POI icons 80b–86b with reference to the position rims 76 and 96. Each lead line 74 connects the original position mark and the displaced POI icon so that the user can distinguish the displaced POI icons from other POI icons (without displacement). Since this example provides an enlarged view of the original positions of the POI icons, the user can easily recognize the POI icons without requiring to see the small dots of position marks in the cursor circle 71.

When many POIs are located within a small area such as in a downtown or a shopping mall, there arises a case where two or more POI icons are located in the same or similar radial direction relative to the center O. As described above with reference to FIGS. 7B and 8, one of the solutions for such a situation is a use of two or more position rims. Thus, if some POIs are overlapped on the same position rim, the navigation system calculates the distance of each POI from the center of the cursor circle (or other predefined region mark) and compares the distance of each POI. Then, the POI icons are displayed in the order of distance on each position rim.

However, the use of two or more position rims may not be sufficient. For example, POI icons 80b and 81b shown in FIGS. 7B and 9B are in the same radial direction and thus the lead lines thereof are overlapped. The lead lines of POI icons 82b and 83b in FIGS. 7B and 9B are not exactly overlapped but are very close to one another. In such a situation, it may be difficult for a user to distinguish which lead line is connected a particular POI icon, or which original position is related to a particular POI icon, unless he carefully checks the images on the screen.

Figure 11:
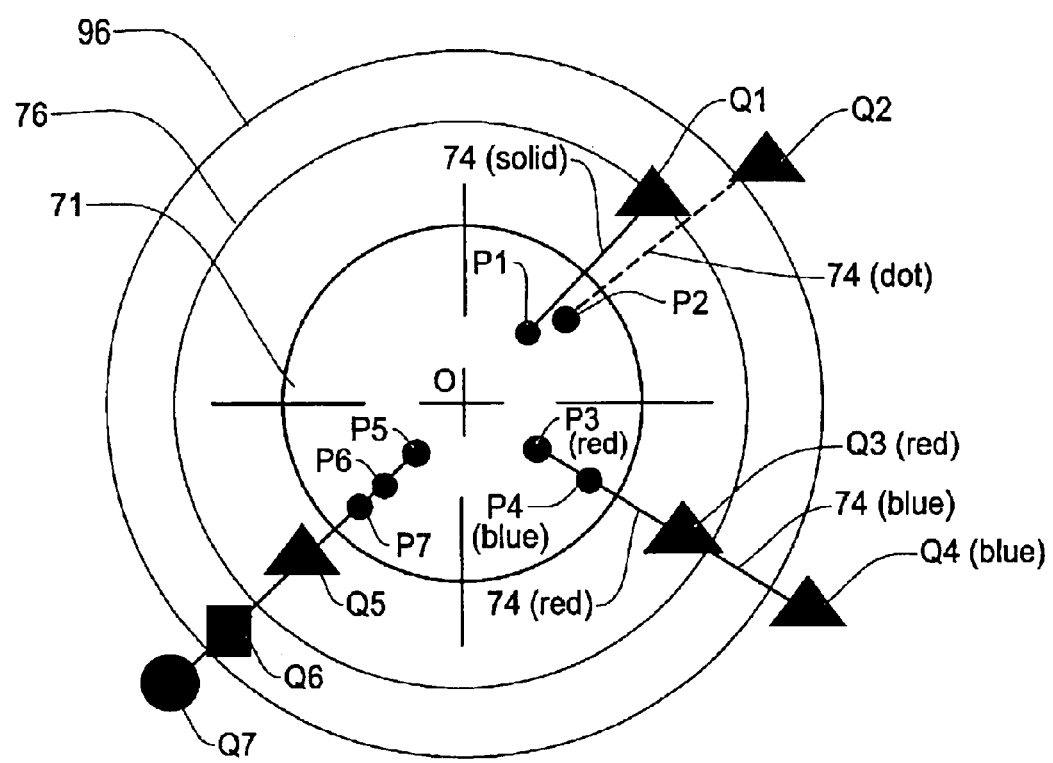
FIG. 11 is a schematic diagrams showing examples of various attributes assigned to lead lines, displaced POI icons, original position marks, etc. for distinguishing POI icons in the same or similar radial directions.

FIG. 11 shows examples of method in the present invention for easily distinguishing POI icons in such a situation. In the example showing the POI icons Q1 and Q2, different line types are used for the lead lines 74. The lead line 74 connecting the position mark P1 and POI icon Q1 is a solid line, while the lead line 74 connecting the position mark P2 and POI icon Q2 is a dotted line. The line type may be prioritized such as solid lines are used for inner POI icons, dotted lines are used for outer POI icons, and such a rule is consistently used. This method is useful for distinguishing the POI icons when the lead lines are close together but not completely overlapped.

In the example showing the POI icons Q3 and Q4, different colors are assigned to the lead lines, position marks and POI icons. The POI icons Q3 and Q4 are on the same radial line which is confusing to the user. Thus, in this example, the same color "red" is assigned to the position mark P3, the corresponding lead line 74 and the POI icon Q3, and the same color "blue" is assigned to the position mark P4, the corresponding lead line 74 and the POI icon Q4. The consistent rule of assigning the colors should be used throughout the operation, such as red, blue, yellow, in the order of distance from the center.

In the example showing the POI icons Q5, Q6, and Q7, different shapes are assigned to the POI icons. The POI icons Q5, Q6 and Q7 are on the same radial line which is confusing to the user if no attributes are used. Thus, in this example, the POI icon Q5 which is closest to the center has a triangle shape, the POI icon Q7 which is farthest from the center has a circular shape, and the POI icon Q6 which is in the middle has a rectangular shape. The consistent rule of assigning the shape should be used throughout the operation, such as described above.

In the manner similar to the example shown in FIGS. 7B and 8 where all displaced POI icons are placed on the position rims, additional position rims can be also formed when the position rims are all full with POI icons and the rest of the POI icons in the cursor circle still need to be moved. For example, if the first and second position rims are full with the POI icons, then the third position rim will be formed to move the rest of the POI icons. Even though the POI icons are not so crowded, the method of using many position rims tend to show the accurate positions of the POIs because the actual distance from the center is reflected when moving the POI icons to a particular position rim.

Figure 12:
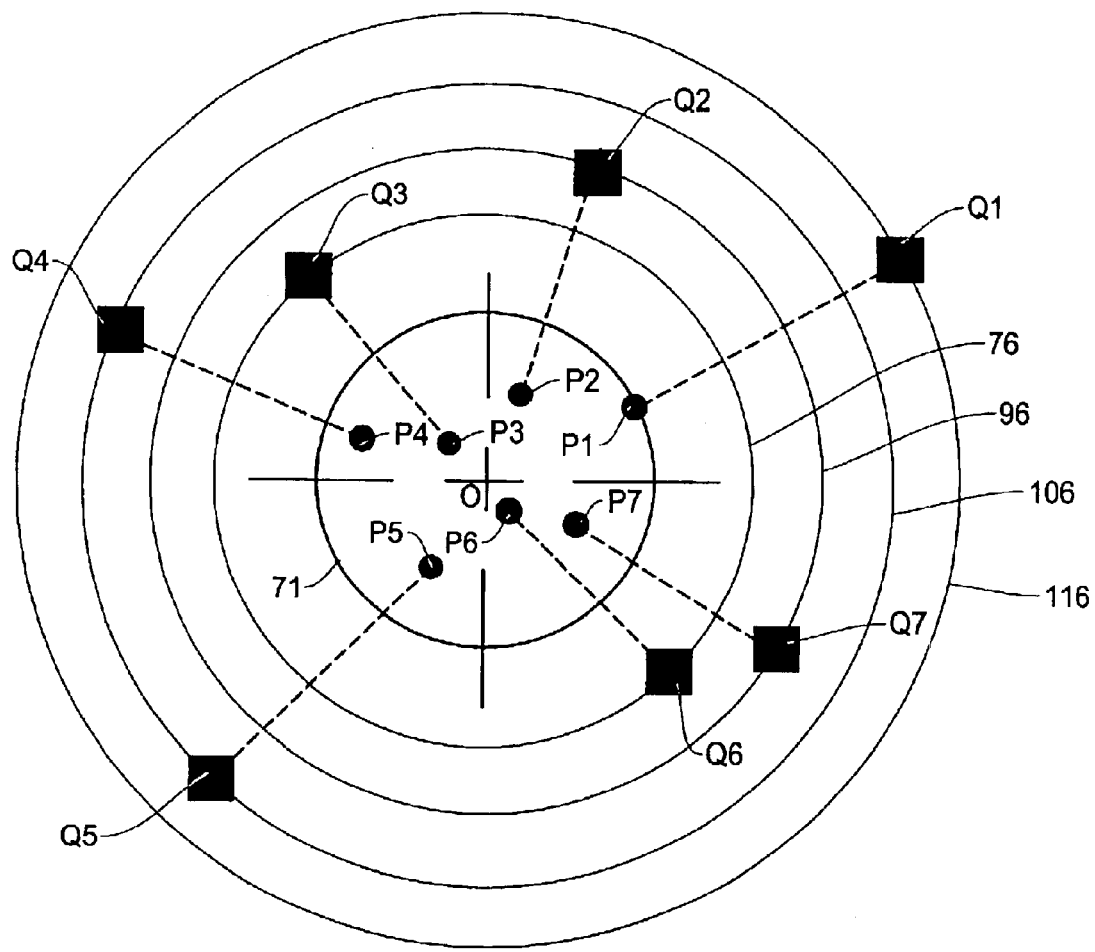
FIG. 12 is a schematic diagram showing an display example in the POI displacement method of the present; invention where four position rims are used.

Such an example is shown in FIG. 12 where four position rims 76, 96, 106 and 116 are incorporated. POI icons Q1–Q7 are moved to the corresponding position rims from the original positions P1–P7. Although each position of the displaced POI icon does not accurately represent the original position, it is able to more closely represent the original position of the POIs than that using only one or two position rims. Therefore, when the screen condition allows, it is preferable to use several position rims rather than one or two position rims for easy search of POIs by the user.

As has been described in the foregoing, according to the present invention, the navigation system enables the user to easily identify the POIs in a cursor circle, even if the POIs are crowded in a small area, by automatically moving them to position rims and showing position marks of the POIs to indicate the accurate positions in the cursor circle. Thus the user can easily check the POI icons and select one of the POIs as his destination.

Although the invention is described herein with reference to the preferred embodiments, one skilled in the art will readily appreciate that various modifications and variations may be made without departing from the spirit and the scope of the present invention. Such modifications and variations are considered to be in the purview and scope of the appended claims and their equivalents.

What is claimed is:

1. A display method for a navigation system, comprising the following steps of:
   specifying POI icons on a map image within a region of a predefined region mark;
   forming a position rim with which is a circle with a center of the region mark;
   displacing the POI icons within the region mark in radial directions to the position rim;
   displaying position marks at positions where the POI icons are located before the displacement within the region mark; and
   displaying lead lines each connecting the POI icon displaced to the position rim and the corresponding position mark.

2. A display method as defined in claim 1, further comprising the steps of:
   changing a position or a size of the predefined region mark on the map image BO that original positions of the POI icons before the displacement are outside of the region mark; and
   reverting back the displaced POI icons whose current positions are outside of the region mark to the original positions.

3. A display method as defined in claim 1, wherein said step of forming the position rim includes a step of forming a plurality of position rims which are circles concentric with respect to the center of the region mark, and said step of displacing the POI icons includes a step of displacing POI icons at shorter distances from the center to an inner position rim while displacing POI icons at longer distances from the center to an outer position rim.

4. A display method as defined in claim 1, wherein said step of forming the position rim includes a step of forming a plurality of position rims which are circles concentric with respect to the center of the region mark, and said step of displacing the POI icons includes a step of displacing POI icons in the same or substantially the same radial direction to the position rims in an order of distance from the center of the predefined region.

5. A display method as defined in claim 1, wherein said predefined region mark is a cursor circle on a monitor screen of a navigation system or a predetermined mark whose covering area can be varied or predefined by the navigation system.

6. A display method as defined in claim 1, wherein predetermined attributes are assigned to said lead lines, position marks, and the displaced POI icons to distinguish two or more POI icons displaced in an identical or similar radial direction.

7. A display method as defined in claim 6, wherein said attribute include colors, line types and shapes, and a consistent rule for assigning the attributes is used throughout an operation of displacing the POI icons based on positions of the POI icons.

8. A display method for a navigation system, comprising the following steps of:
   specifying POI icons on a map image within a region of a predefined region mark;
   forming a position rim which is a circle with a center of the region mark;
   displacing the POI icons within the region mark to radial directions in proportion to original distances of the POI icons from the center of the region mark;
   displaying position marks at positions where the POI icons have been located before the displacement within the region mark; and
   displaying lead lines each connecting the POI icon displaced in the radial direction and the corresponding position mark.

9. A display method as defined in claim 8, further comprising the steps of:
   changing a position or a size of the predefined region mark on the map image so that original positions of the POI icons before the displacement are outside of the region mark; and
   reverting back the displaced POI icons whose current positions are outside of the region mark to the original positions.

10. A display method as defined in claim 8, wherein said step of forming the position rim includes a step of forming a plurality of position rims which are circles concentric with respect to the center of the region mark.

11. A display method as defined in claim 8, wherein said predefined region mark is a cursor circle on a monitor screen of a navigation system or a predetermined mark whose covering area can be varied or predefined by the navigation system.

12. A display method as defined in claim 8, wherein predetermined attributes are assigned to said lead lines, position marks, and the displaced POI icons to distinguish two or more POI icons displaced in an identical or similar radial direction.

13. A display method as defined in claim 12, wherein said attributes include colors, line types, and shapes, and a consistent rule for assigning the attributes is used throughout an operation of displacing the POI icons based on positions of the POI icons.

14. A display apparatus for a navigation system, comprising:
    means for specifying POI icons on a map image within a region of a predefined region mark;
    means for forming a position rim which is a circle with a center of the region mark;
    means for displacing the POI icons within the region mark in radial directions to the position rim;
    means for displaying position marks at positions where the POI icons are located before the displacement within the region mark; and
    means for displaying lead lines each connecting the POI icon displaced to the position rim and the corresponding position mark.

15. A display apparatus as defined in claim 14, further comprising:
    means for changing a position or a size of the predefined region mark on the map image so that original positions of the POI icons before the displacement are outside of the region mark; and
    means for reverting hack the displaced POI icons whose current positions are outside of the region mark to the original positions.

16. A display apparatus as defined in claim 14, wherein said means for forming the position rim includes means for forming a plurality of position rims which are circles concentric with respect to the center of the region mark, and said means for displacing the POI icons includes means for displacing POI icons at shorter distances from the center to an inner position rim while displacing POI icons at longer distances from the center to an outer position rim.

17. A display apparatus as defined in claim 14, wherein said means for forming the position rim includes means for forming a plurality of position rims which are circles concentric with respect to the center of the region mark, and said means for displacing the POI icons includes means for displacing POI icons in the same or substantially the same radial direction to the position rims in an order of distance from the center of the predefined region.

18. A display apparatus as defined in claim 14, wherein said predefined region mark is a cursor circle on a monitor screen of a navigation system or a predetermined mark whose covering area can be varied or predefined by the navigation system.

19. A display apparatus as defined in claim 14, wherein predetermined attributes are assigned to said lead lines, position marks, and the displaced POI icons to distinguish two or more POI icons displaced in an identical or similar radial direction.

20. A display apparatus as defined in claim 19, wherein said attribute include colors, line types and shapes, and a consistent rule for assigning the attributes is used throughout an operation of displacing the POI icons based on positions of the POI icons.

21. A display apparatus for a navigation system, comprising:
    means for specifying POI icons on a map image within a region of a predefined region mark;
    means for forming a position rim which is a circle with a center of the region mark;
    means for displacing the POI icons within the region mark to radial directions in proportion to original distances of the POI icons from the center of the region mark;
    means for displaying position marks at positions where the POI icons have been located before the displacement within the region mark; and
    means for displaying lead lines each connecting the POI icon displaced in the radial direction and the corresponding position mark.

22. A display apparatus as defined in claim 21, further comprising:
    means for changing a position or a size of the predefined region mark on the map image so that original positions of the POI icons before the displacement are outside of the region mark; and
    means for reverting back the displaced POI icons whose current positions are outside of the region mark to the original positions.

23. A display apparatus as defined in claim 21, wherein said means for forming the position rim includes means for forming a plurality of position rims which are circles concentric with respect to the center of the region mark.

24. A display apparatus as defined in claim 21, wherein said predefined region mark is a cursor circle on a monitor screen of a navigation system or a predetermined mark whose covering area can be varied by a user or predefined by the navigation system.

25. A display apparatus as defined in claim 21, wherein predetermined attributes are assigned to said lead lines, position marks, and the displaced POI icons to distinguish two or more POI icons displaced in an identical or similar radial direction.

26. A display apparatus as defined in claim 25, wherein said attributes include colors, line types, and shapes, and a consistent rule for assigning the attributes is used throughout an operation of displacing the POI icons based on positions of the POI icons.

* * * * *